Dec. 21, 1937.  J. R. FABER  2,103,002
SNAPPING ROLLER
Filed April 28, 1937
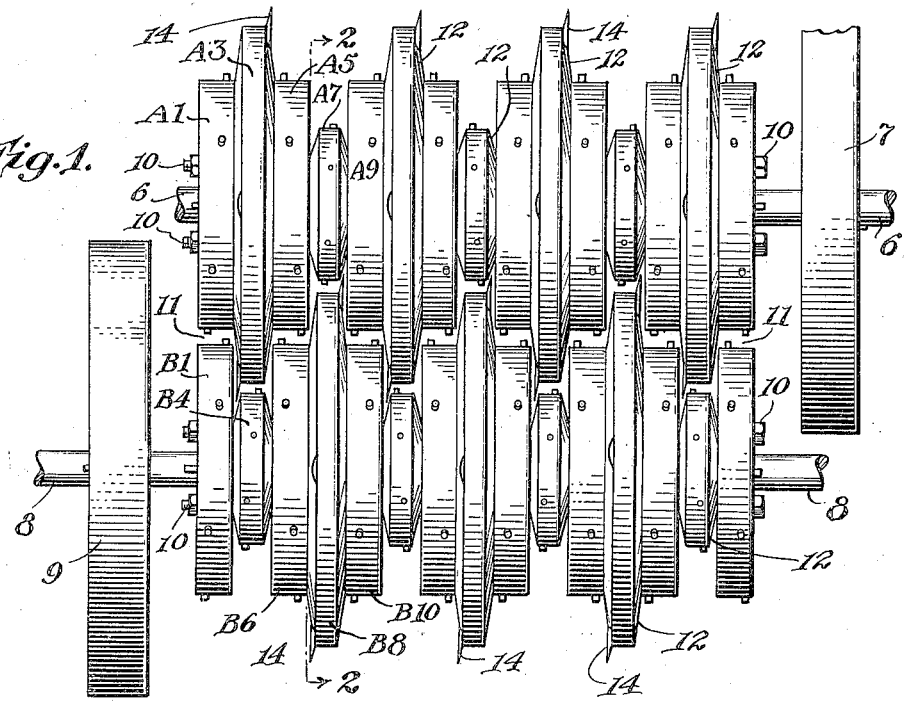
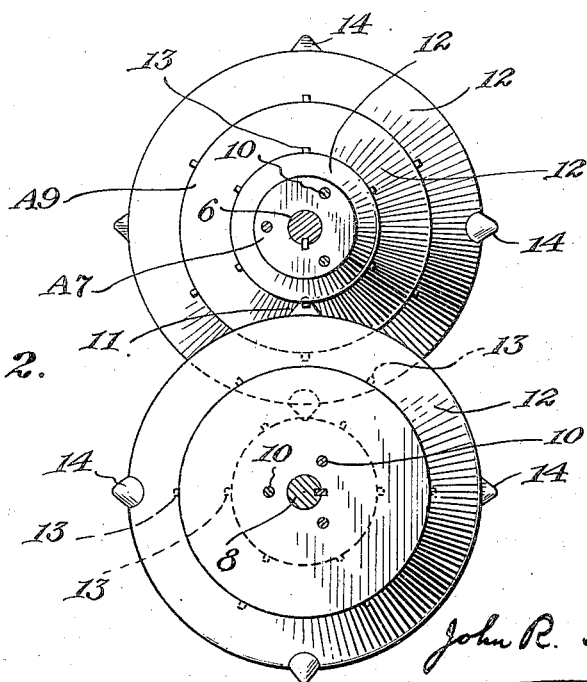
Inventor
John R. Faber
By Geo. A. Tew
Attorneys Patented Dec. 21, 1937

2,103,002

UNITED STATES PATENT OFFICE 2,103,002

SNAPPING ROLLER

John Rudolph Faber, Flint, Mich.

Application April 28, 1937, Serial No. 139,575

1 Claim. (Cl. 130—5)

This invention relates to what are known as stripping or snapping rolls usually used for detaching and separating ears of corn from the stalks and husks as they are passed through the rollers.

The object of the present invention is to improve the construction and operation of such rolls, by means of which the stalks are caused to be distributed between the rollers in a more efficient manner, resulting in a more rapid operation, with less liability to clog or choke, and which will more efficiently separate the ear corn from the fodder.

These advantages result from the use of what may be called stepped rollers arranged in a series consisting of a plurality of disks of different sizes, the disks of the respective rollers being spaced apart to produce a zigzag space or throat between the rollers, through which space the stalks and fodder will pass, the rollers acting to snap and separate the ears from the stalks.

The invention may be embodied in various forms, one of which is illustrated in the accompanying drawing in which:—

Fig. 1 is a front elevation of the rollers and,

Fig. 2 is a section on the line 2—2 of Fig. 1.

As shown, each roller is made or built up of a plurality of disks, which may be made of wood or other suitable material. These disks vary in diameter and are arranged as shown in series from small to large. Three sizes are shown, small, medium, and large.

When assembled as shown a medium sized disk Al is spaced opposite a medium sized disk Bl; a large disk A3 is spaced opposite a small disk B4; a medium disk A5 opposite a medium disk A6; a small disk A7 opposite a large disk B8; then a medium disk A9 opposite a medium disk B10; and so on, as many sets of disks being used as may be desired, according to the length of the rollers to be used or constructed.

The disks of the upper roller are mounted on a shaft 6, which may be driven by a pulley 7 at one end. The disks of the lower roller are mounted on a shaft 8 which may be driven by a pulley 9, and the disks may be keyed to the shafts and connected together in any suitable manner, as by means of a number of long bolts 10 extending through the disks of each roller.

When the rollers are assembled in the manner shown and described an irregular space or throat 11 is produced between the rollers, having a general zigzag form, the space being sufficient to pass the stalks and fodder but not enough to pass the ears of corn which by the action on the rollers are snapped from the stalks and drop in front of the machine.

The large disks, A3, B8, etc., as well as the small disks such as B4 and A7 are beveled at the edges or sides as indicated at 12, so that the large disks of one roller will clear the corners of the medium disks of the other roller.

Also the various disks may be provided with a number of projections or semi-teeth or pins 13, and the edges of the large disks may be provided with a number of projecting teeth or blades 14 which will pass in the space between the small disks and the medium disks, that is the space produced by the tapered or beveled edges 12.

The purpose of these teeth is to assist in drawing the stalks between the rollers and they also act to shred or strip the fodder from the stalks.

I am aware that it has been proposed to use corrugated husking rollers, but these lack the advantage of the stepped arrangement herein disclosed. These steps increase the area of the space or passage between the rollers, and the zigzag opening permits the stalks to be spread thinner and evener than would otherwise be the case. In the use of stripping rollers of this kind it is highly desirable that the stalks be spread evenly and not bunched. The operation of the stepped rollers is to push some of the stalks up and push others down, as they pass through the zigzag throat, thereby permitting a greater volume of material to pass and so spreading the material that the ears will be more readily snapped off than with plain or ordinary corrugated rollers. The stepped structure has been found to most efficiently distribute the stalks and also to snap off the ears, without clogging or bunching to produce choking.

Instead of being made up of a plurality of separate disks of different sizes it is possible that the rollers may be formed in a different manner, while preserving the zigzag space or passage resulting from a stepped arrangement, whereby circular stepped ribs are produced which fit into stepped grooves in the opposite roller, the whole forming a pair of rollers characterized by interfitting stepped ribs and grooves spaced apart a sufficient distance to permit the passage of the stalks and husks.

I claim:

A pair of snapping rollers, each roller comprising a series of disks of different diameters assembled in relation beside each other to form ribs and grooves the sides of which are stepped, the peripheries of the disks being uncorrugated and the surfaces of the rollers being spaced from each other at all points to form a clear zigzag passage between the rollers, the side edges of some of the smaller diametered disks being beveled and other mating larger diametered disks having teeth projecting into the spaces produced by the bevels.

JOHN RUDOLPH FABER.